(12) United States Patent
Himbeault et al.

(10) Patent No.: US 6,711,155 B1
(45) Date of Patent: Mar. 23, 2004

(54) DISTRIBUTED PBX, KSU AND THE LIKE SYSTEM UTILIZING INTERNET PROTOCOL

(75) Inventors: Lee C. Himbeault, Calgary (CA); Steven J. Rhodes, Nepean (CA); Ronald G. Wellard, Kanata (CA); Paul A. Senyshyn, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/474,388

(22) Filed: Dec. 29, 1999

(51) Int. Cl.[7] .............................................. H04L 12/66
(52) U.S. Cl. ....................................... 370/352; 379/371
(58) Field of Search ................................. 370/352, 353, 370/355, 465, 466, 517, 516; 379/371, 372

(56) References Cited

U.S. PATENT DOCUMENTS

| | | | | |
|---|---|---|---|---|
| 4,006,314 A | * | 2/1977 | Condon et al. ................ 179/15 |
| 5,563,891 A | * | 10/1996 | Wang ......................... 370/505 |
| 6,353,609 B1 | * | 3/2002 | Etheridge et al. ........... 370/352 |
| 6,594,329 B1 | * | 7/2003 | Susnow ....................... 375/372 |

* cited by examiner

Primary Examiner—Douglas Olms
Assistant Examiner—Robert W. Wilson
(74) Attorney, Agent, or Firm—L. Anne Kinsman; Borden Ladner Gervais LLP

(57) ABSTRACT

A distributed PBX, KSU and the like system has at least one time domain multiplexed (TDM) switch unit interfaced with transparent wideband channels such as Ethernet by means of at least one Public Switched Telephone Network (PSTN) interface unit and at least one service module (SM) interconnecting it to remote station terminals. One or more applications servers may be located where available or convenient and interact with the TDM switch unit by means of IP addressable path or paths.

5 Claims, 5 Drawing Sheets

DISTRIBUTED PBX, KSU AND THE LIKE SYSTEM UTILIZING INTERNET PROTOCOL

BACKGROUND OF THE INVENTION

1. Field of the Invention

The present invention relates generally to private branch exchanges (PBX), key system units (KSU) and the like systems. In particular, it relates to novel, distributed systems, especially utilizing the internet protocol (IP) and wideband data links such as Ethernet, Token Ring or the like channels.

2. Background of the Invention

A traditional time-division multiplex (TDM) PBX is a centralized unit with voice trunks connecting it to the telephony central (switching) office (CO) and local station circuits interconnecting it to the station terminals. Such PBX systems may be expanded by adding trunk and station expansion units. It may have additional telephony applications, provided by means of a co-located server interconnected with the centralized unit through a proprietary interface protocol, such as voice mail, call centre, interactive voice response or computer telephony integration.

Such PBX and KSU systems are normally used by commercial enterprises, which often have several offices and locations, which makes it cumbersome to efficiently employ, reconfigure or expand the centralized systems.

SUMMARY OF THE INVENTION

The present invention enables a distributed system to be employed throughout an entity's offices and locations, reducing initial and continuing costs by focusing subcomponents interconnection in a standard transmission medium (such as Ethernet) and protocol (such as IP or Novell's IPX). This also facilities consolidation and integration of the system within the wide area network (WAN).

A distributed PBX, KSU and the like system according to the present invention has at least one time domain multiplexed (TDM) switch unit interfaced with transparent wideband channels such as Ethernet by means of at least one Public Switched Telephone Network (PSTN) interface unit and at least one service module (SM) interconnecting it to remote station terminals. One or more applications servers may be located where available or convenient and interact with the TDM switch unit by means of IP addressable path or paths.

An advantage of the above mentioned system is that it need not carry timing information for purposes of synchronization, which is therefore achieved in the preferred implementation by using the data cell/packet departure and arrival rates between the TDM switch and the TDM peripherals.

A more general advantage of the present system is that entities may utilize both traditional PSTN and the IP network for voice communication with seamless and transparent transition between them to the user. It is therefore possible to use advanced features such as paging, call forwarding/transfer, agent queuing and other advanced features in an IP distributed environment. For a geographically distributed organization the cost of implementation is significantly lower than previously.

BRIEF DESCRIPTION OF THE DRAWINGS

The preferred embodiments of the present invention will now be described in detail in conjunction with the drawings, in which.

DETAILED DESCRIPTION OF THE PREFERRED EMBODIMENT

Figure 1:
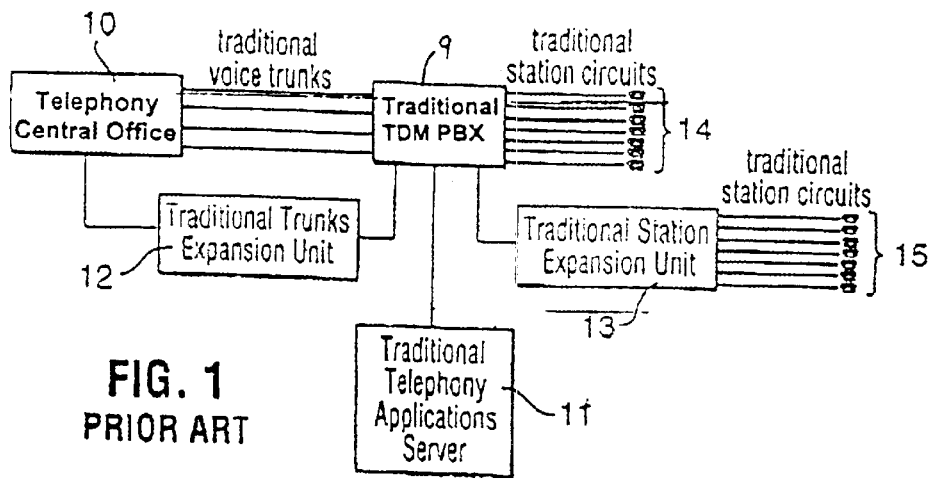
FIG. 1 illustrates a non-distributed prior art TDM PBX.

Referring to FIG. 1 of the drawings, it shows a prior art PBX system having a TDM PBX 9, wherein all of the component units shown, except for telephony central office (CO) of the PSTN, are usually co-located in close proximity including the server 11, trunk and station expansion units 12 and 13 and, of course, the station terminals themselves 14 and 15.

Figure 2:
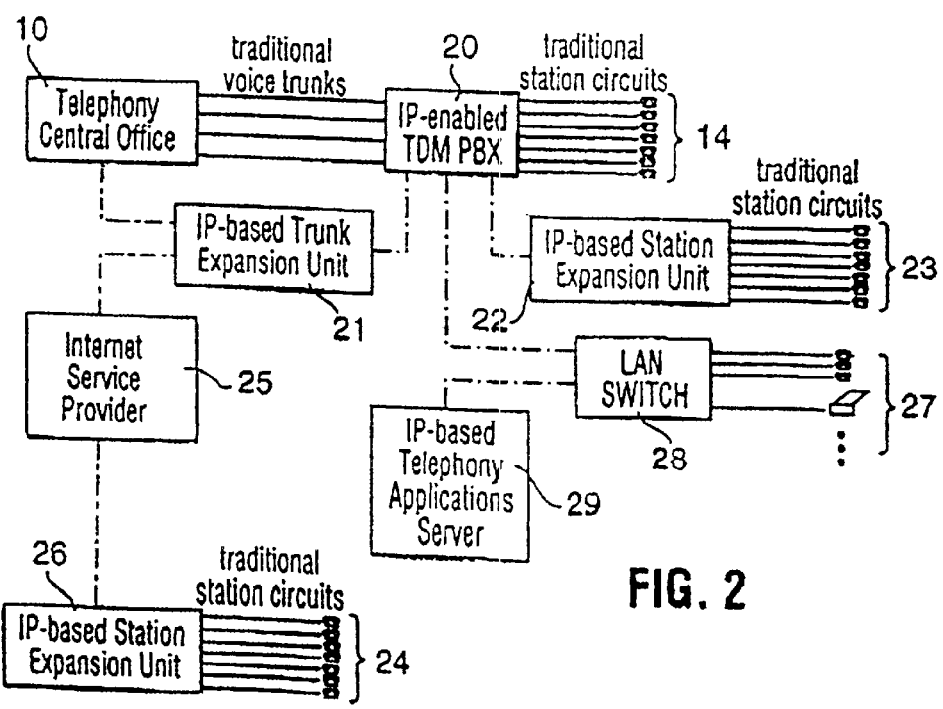
FIG. 2 is a high-level block diagram of an IP-based distributed TDM PBX according to the present invention.

In FIG. 2, a PBX system is shown which, in addition to the prior art configuration, is IP-enabled by having an IP-enabled TDM PBX 20, IP-based trunk and station expansion units 21 and 22, respectively. The station terminals or circuits 14 are, of course, local; however station terminals or circuits 23 may now be remote from the PBX 20. Further station terminals or circuits 24 may also be provided with PBX 20 service via an internet service provider (ISP) 25 and IP-based station expansion unit 26. Other non-traditional station terminals 27, such as LAN-based IP phones, PC-based "soft" phones and the like, may be served by the PBX 20 via an IP conversant LAN switch 28, which also provides telephony applications via IP-based server 29, such as voice mail, call centre, interactive voice response, computer telephony integration, telephone number-to-IP address resolution tables, etc.

Figure 3:
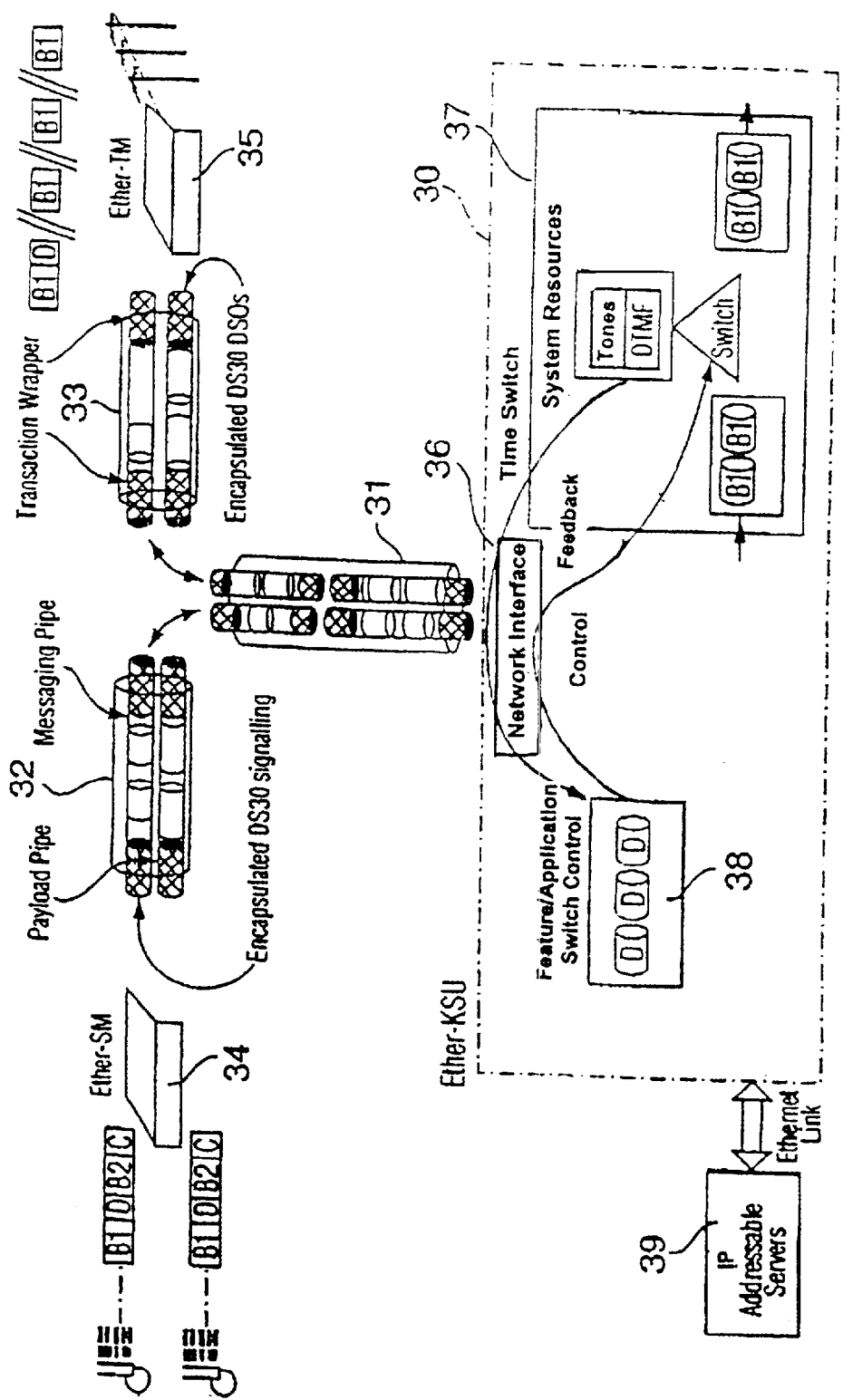
FIG. 3 is an illustrative schematic diagram of the IP-enabled TDM PBX shown in FIG. 2.

The illustrative schematic of FIG. 3 shows a KSU 30 interconnected to service module (SM) 34 and to trunk module (TM) 35. The channels 31, 32 and 33 carry standard DS 30 signalling channels (D) and several DS-O voice channels in the example shown (B1, B2, . . . being voice samples). A KSU network interface 36 interfaces the KSU time switch 37 or core controller, with the channel 31 and with application switch controller 38. The SM 34 communicates with stations via conventional connections carrying voice (B1, B2, . . . ) and signalling information (D, C, . . . ). The KSU 30 also has ethernet link (or links) to IP addressable servers 39.

Figure 4:
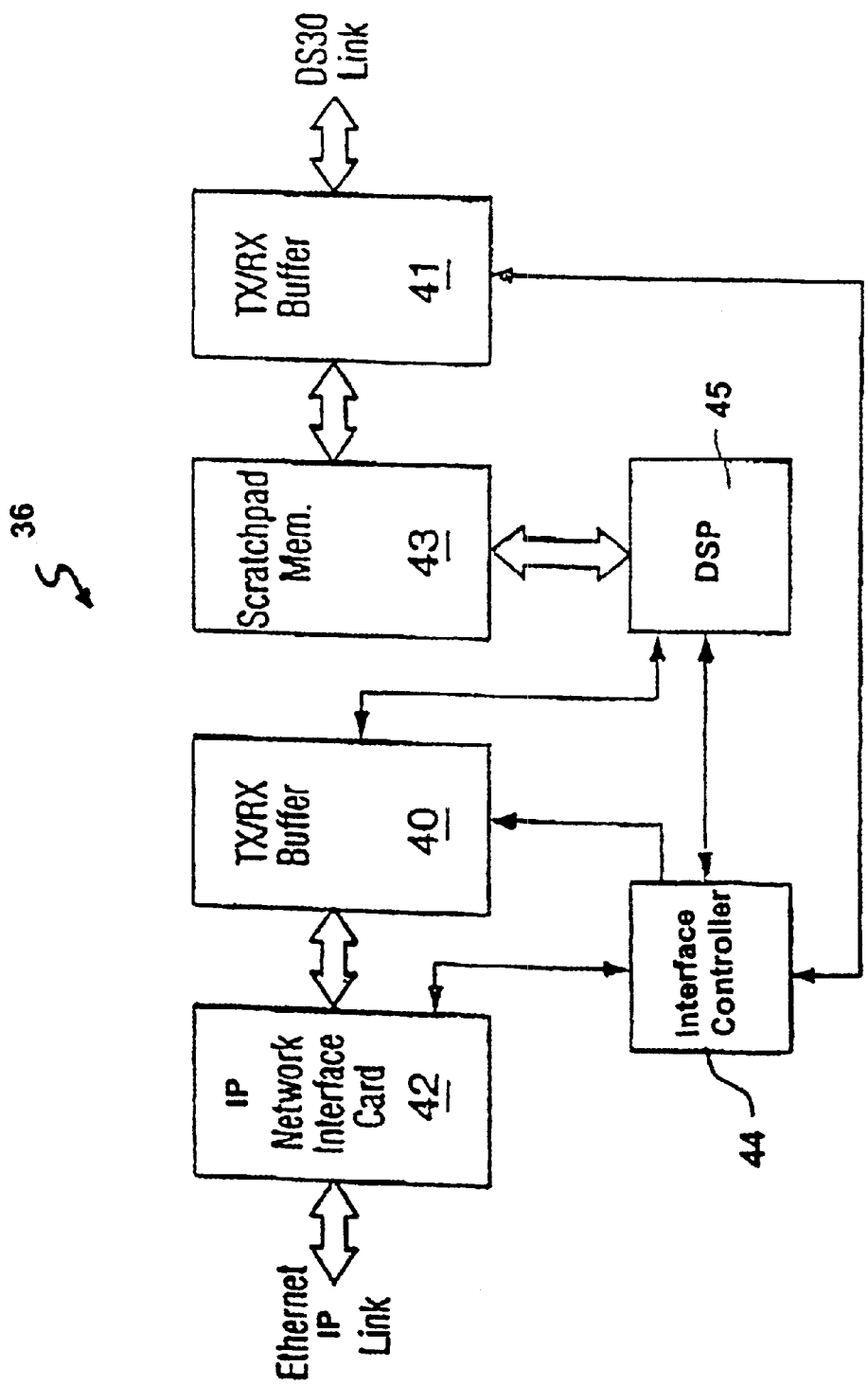
FIG. 4 is a high-level block diagram of the Network Interface shown in FIG. 3.

A functional block diagram of the KSU network interface 36 is shown in FIG. 4. It comprises two transmit/receive (TX/RX) buffers 40 and 41, an IP network interface card (NIC) 42 (a standard item available for example, from National Semi-conductor), a switch-pad memory 43, interface controller 44 and DSP 45. Details of the buffers (40, 41) and their synchronization circuits are shown in FIG. 5.

Figure 5:
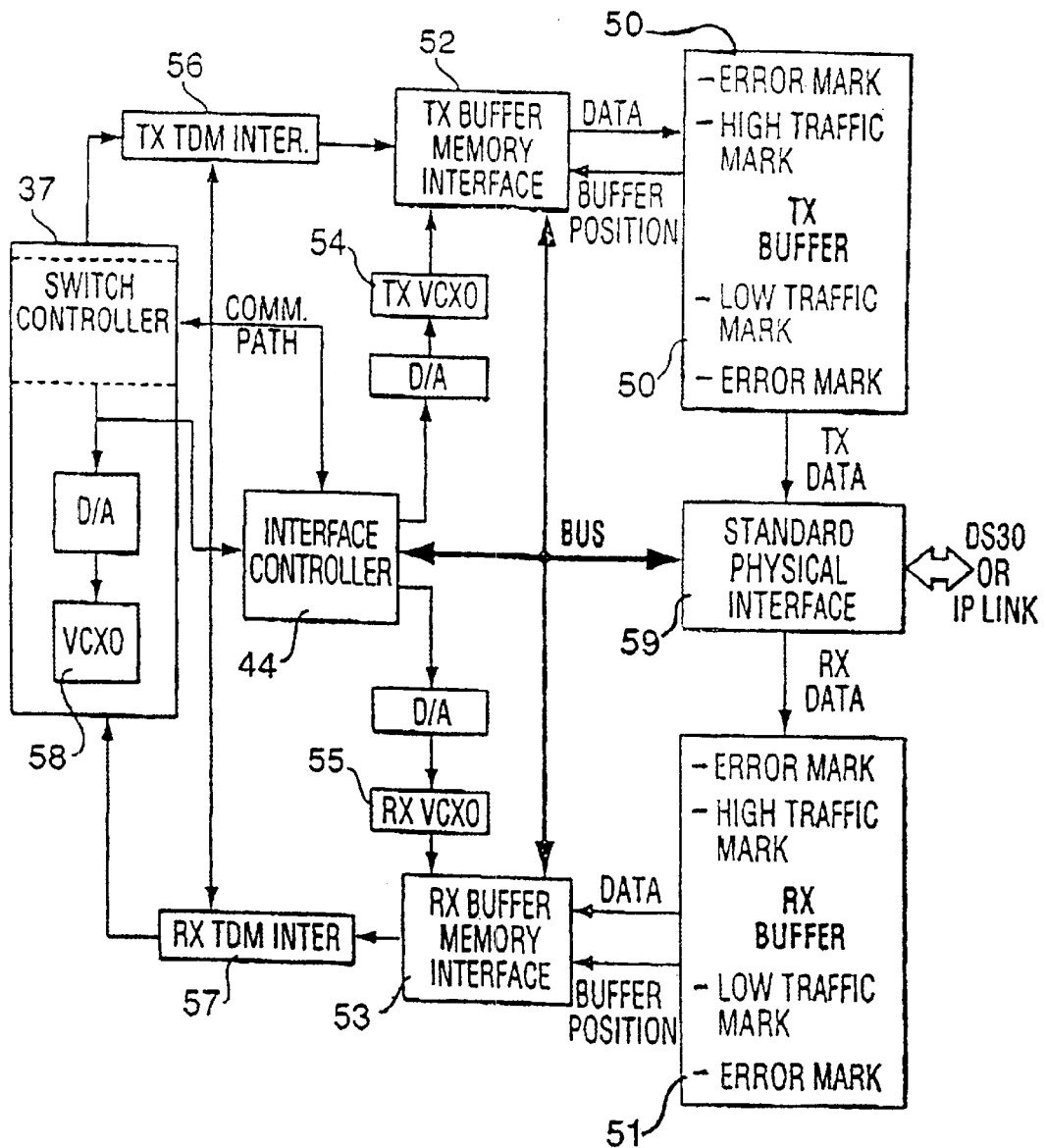
FIG. 5 is a block diagram showing the synchronization circuitry of the buffer shown in FIG. 4.

With reference to FIG. 5, a buffer (40, 41) actually comprises two functionally separate components: a TX buffer 50 and a RX buffer 51, each of which has indicators for: error marks (high and low); and high traffic/low traffic marks. The buffer position is continuously monitored by TX and RX buffer memory interfaces 52 and 53, respectively. These interfaces 52 and 53 also interface the TX and RX data to and from the buffers 50, 51. The TX interface 52 is clocked by a TX VCXO (voltage controlled oscillator) 54, while the RX interface 53 is clocked by a RX VCXO 55. TX data is applied to TX interface 52 through a TX TDM interface 56 (an elastic store); and the RX data is applied from the RX interface 53 to a RX TDM interface 57 (also an elastic store). Both TX TDM and RX TDM interfaces 56 and 57 are, however, clocked by a VCXO 58 of the core TDM switch 37. As usual, the VCXOs 54, 55 and 58 are controlled via digital-to-analog converters (D/A). A status information and control bus (BUS) interconnects the interface controller 44, the TX interface 52, the RX interface 53 and a standard physical interface(to DS30 or ethernet IP link).

Figure 6:
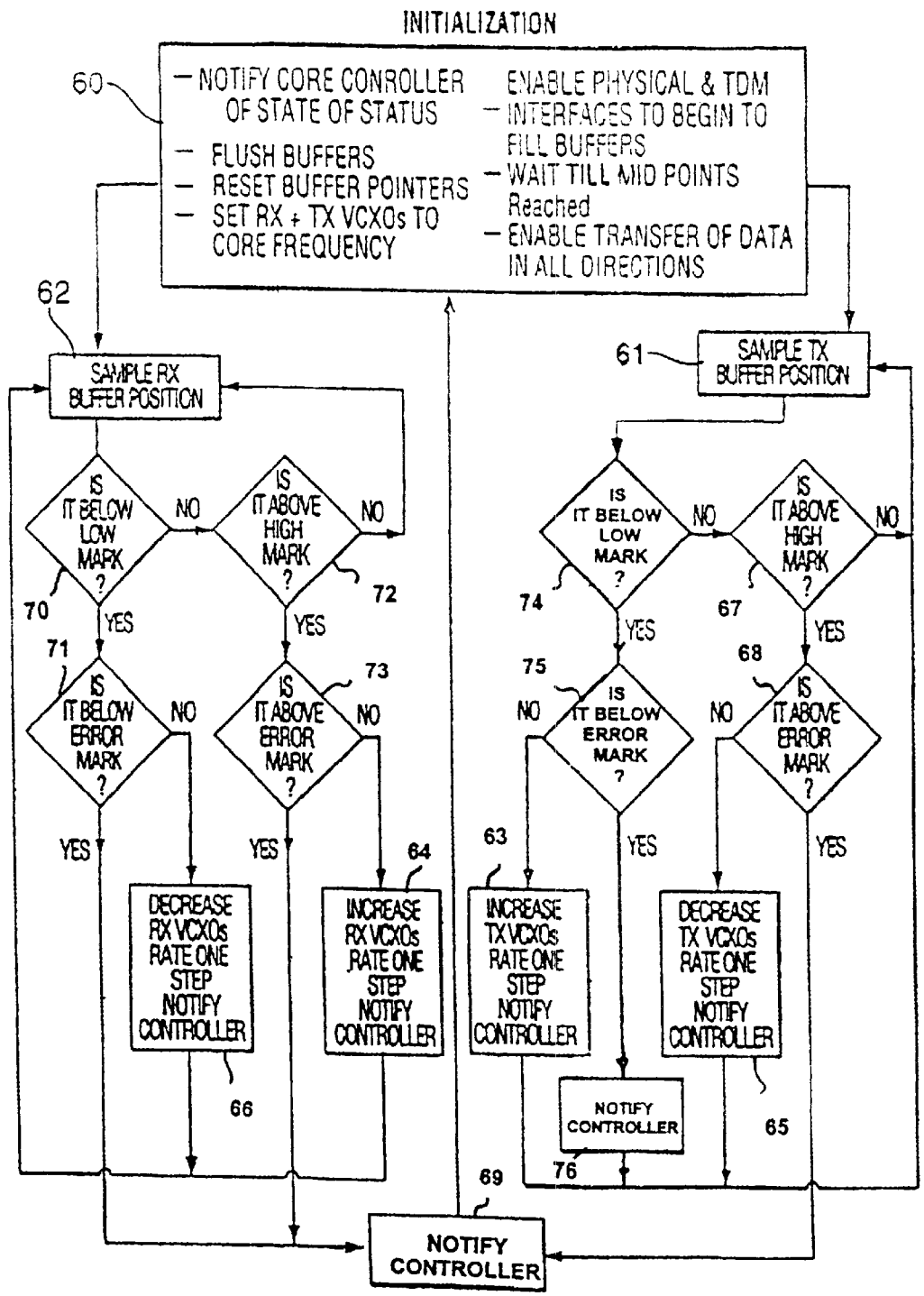
FIG. 6 is a flow-chart for effecting the synchronization in the circuit shown in FIG. 5 by the interface controller.

As may be seen from FIG. 5, the synchronization circuit is essentially symmetrical in TX and RX directions. This is reflected in the symmetry of the synchronization flow-chart for the interface controller 44 as shown in FIG. 6. After the initialization step 60, the interface controller 44 monitors or samples the TX buffer position (61) and the RX buffer position (62) and alters the respective TX and RX VCXOs up (63 and 64) or down (65 and 66) depending on the sampled buffer position. Certain error conditions indicated by a buffer status trigger the following actions:

From TX side

Transmit buffer too high (67, 68): caused by either network congestion or far end throttling traffic; to remedy, drop TDM input traffic and signal far end of condition (65) if buffer position is not above high error mark.
    If condition persists, and buffer position is not above high error mark notify all stakeholders and reset and re-initialize 60.

From RX side

Receive buffer too low (70, 71) caused by network congestion or issues with the far end (70, 71): to remedy, either start repeating previous patterns or transmit an "idle" pattern in TDM payload) and notify parties (66).
    If condition persists notify (69) and reset and re-initialize (69).
RX buffer too high (72, 73) caused by:
    far end sending too fast to remedy, throttle far end and start dropping incoming packets (64).
    If condition persists notify far end of status (69), reset and re-initialize (60).

Other Conditions

TX buffer low (74, 75): this is OK; monitor situation and communicate with far end (76) to ensure buffers of adequate size on other side of link; if not, this is a synchronization issue between two TDM switches which can be solved by TDM resynchronization (63).

The applications and operation with respect to the traditional PBXs or KSUs remain the same as above.

What is claimed is:

1. A distributed private branch exchange (PBX) system including a network supporting internet protocol (IP) communication and a time division multiplexed (TDM) switch unit having a core controller, the system comprising:
    a network interface for interfacing the TDM switch unit, via the network, with at least one of a plurality of remote station terminals, the network interface including;
        a buffer including an elastic transmit buffer and an elastic receive buffer, the elastic transmit buffer and the elastic receive buffer each having indicators for high and low error marks as well as high and low traffic marks; and
        a synchronization circuit for providing synchronization between the TDM switch unit and the remote station terminals by notifying the core controller of a buffer position based on an incoming data rate at the buffer.

2. The system of claim 1 wherein the network interface is part of an IP-enabled key system unit (KSU).

3. The system of claim 1 wherein the synchronization circuit comprises a buffer memory interface for sampling the buffer position in order to determine the incoming data rate at the buffer.

4. The system of claim 1 wherein the synchronization circuit comprises transmit and receive voltage controlled oscillators to provide synchronization between the TDM switch unit and the remote station terminals based on departure and arrival rates of data packets from and into the transmit and receive buffers, respectively.

5. The system of claim 4 wherein the synchronization circuit comprises a network interface controller for sampling a buffer position at each of the transmit and receive buffers and altering the transmit and receive voltage controlled oscillators based on the sampled buffer positions.

* * * * *